(12) United States Patent
Hyeon et al.

(10) Patent No.: US 11,432,383 B2
(45) Date of Patent: Aug. 30, 2022

(54) MODULAR DISPLAY APPARATUS AND METHOD FOR CONTROLLING THEREOF

(71) Applicant: SAMSUNG ELECTRONICS CO., LTD., Suwon-si (KR)

(72) Inventors: Byeongcheol Hyeon, Suwon-si (KR); Kyuho Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/229,329

(22) Filed: Apr. 13, 2021

(65) Prior Publication Data
US 2022/0191986 A1  Jun. 16, 2022

(30) Foreign Application Priority Data
Dec. 15, 2020  (KR) .................. 10-2020-0175823

(51) Int. Cl.
*H05B 45/30* (2020.01)
*G09G 3/32* (2016.01)
(Continued)

(52) U.S. Cl.
CPC .............. *H05B 45/30* (2020.01); *G09G 3/32* (2013.01); *H05B 47/105* (2020.01); *G09G 2310/08* (2013.01); *G09G 2360/04* (2013.01)

(58) Field of Classification Search
CPC ...... H05B 45/30; H05B 47/105; H05B 47/11; G09G 3/32; G09G 3/3258; G09G 3/3266; G09G 2310/08; G09G 2360/04; G09G 2330/022; G09G 2300/00; G09G 2320/00; G06F 3/14; G06F 3/1446
See application file for complete search history.

(56) References Cited

U.S. PATENT DOCUMENTS

2004/0212573 A1  10/2004  Sundahl et al.
2017/0092195 A1   3/2017  Jung
(Continued)

FOREIGN PATENT DOCUMENTS

CN    111240383 A    6/2020
EP    3748619 A1    12/2020
(Continued)

OTHER PUBLICATIONS

Communication dated Sep. 7, 2021, issued by the International Searching Authority in counterpart International Application No. PCT/KR2021/004446(PCT/ISA/210 and PCT/ISA/210/237).
(Continued)

*Primary Examiner* — Thai Pham
(74) *Attorney, Agent, or Firm* — Sughrue Mion, PLLC

(57) ABSTRACT

A modular display apparatus having a plurality of sub-screens including sensors; a plurality of pixels; and processors configured to: acquire an electric energy of the plurality of pixels based on voltages across light emitting diodes of the plurality of first pixels; and operate in a dehumidification mode based on humidity information acquired from the sensors being greater than or equal to a predetermined threshold. The operating in the dehumidification mode include controlling one or more of a driving time of the light emitting diodes and a voltage of cathodes of the light emitting diodes such that an average value of the electric energy is held at a predetermined value.

19 Claims, 12 Drawing Sheets

(51) Int. Cl.
*G06F 3/14* (2006.01)
*H05B 47/105* (2020.01)

(56) References Cited

U.S. PATENT DOCUMENTS

2017/0352310 A1* 12/2017 Kim .................. G06F 3/1446
2021/0048969 A1*  2/2021 Kim .................. G09G 3/2096
2021/0134212 A1*  5/2021 Kim .................. G06F 3/1446

FOREIGN PATENT DOCUMENTS

| KR | 10-2005-0011247 A |   | 1/2005  |
|----|-------------------|---|---------|
| KR | 20050011247 A     | * | 1/2005  |
| KR | 2020080000302 U   |   | 3/2008  |
| KR | 101453290 B1      |   | 11/2014 |
| KR | 1020150069197 A   |   | 6/2015  |
| KR | 1020190108965 A   |   | 9/2019  |

OTHER PUBLICATIONS

Doit Vision, "How to Calculate LED Display Power Consumption?", Jun. 24, 2020 (Total 6 pages).

* cited by examiner 110-1

MODULAR DISPLAY APPARATUS AND METHOD FOR CONTROLLING THEREOF

CROSS-REFERENCE TO RELATED APPLICATIONS

This application is based on and claims priority under 35 U.S.C. § 119 to Korean Patent Application No. 10-2020-0175823, filed on Dec. 15, 2020 in the Korean Intellectual Property Office, the disclosure of which is incorporated herein by reference in its entirety.

BACKGROUND

1. Field

The disclosure relates to a modular display apparatus and a method for controlling thereof, and more particularly, to a modular display apparatus capable of operating in a dehumidification mode and a method for controlling thereof.

2. Description of the Related Art

When a light emitting diode (LED) of a display apparatus is not driven for a long time in an environment of high humidity or low temperature, moisture (or humidity) may be generated in LEDs or near the LEDs of the display apparatus. In this state, when electric signals are output to both ends of the LED for driving the LED of the display apparatus, metal ions may be precipitated at both ends of the LED due to a low amount of saturated water vapor, and these metal ions may be moved from one end of the LED to the other end due to magnetic fields generated at both ends of the LED. Due to this, a migration phenomenon in which both ends of the LED are conducted may occur, which causes an LED damage (or defect) problem.

SUMMARY

According to an aspect of the disclosure, a modular display apparatus includes a plurality of sub-screens including a first sub-screen, the first sub-screen including: a first sensor; a first display module comprising a plurality of first pixels; and a first processor configured to: acquire a first electric energy of the plurality of first pixels based on voltages across first light emitting diodes of the plurality of first pixels; and operate in a dehumidification mode based on humidity information acquired from the first sensor being greater than or equal to a predetermined threshold. Operating in the dehumidification mode may include controlling one or more of a driving time of the first light emitting diodes and a voltage of cathodes of the first light emitting diodes such that an average value of the first electric energy is held at a predetermined value.

The first processor may be further configured to acquire information on the average value of the first electric energy the voltage across the first light emitting diodes measured during a predetermined time period.

An integrated circuit (IC) may be electrically connected to both ends of the first light emitting diodes. The first processor may be further configured to: calculate, based on the voltage across the first light emitting diodes measured during the predetermined time period by the IC, the average value of the first electric energy; and transmit one or more of: a signal for controlling the driving time of the first light emitting diodes to the IC such that the average value of the first electric energy becomes the predetermined value; and a signal for controlling a voltage applied to the cathodes of the first light emitting diodes to the IC such that the average value of the first electric energy becomes the predetermined value.

The predetermined time period may include a first time period and a second time period. The first processor may be further configured to: apply a forward voltage to the first light emitting diodes during the first time period; apply a reverse voltage to the first light emitting diodes during the second time period; acquire, through the IC, information on a first voltage across the first light emitting diodes measured during the first time period and a second voltage across both ends of the light emitting diodes measured during the second time period; and calculate the average value of the first electric energy based on the information on the first voltage and the second voltage.

The first processor may be further configured to control one or more of the driving time of the first light emitting diodes and the voltage of the cathodes of the first light emitting diodes such that the average value of the first electric energy becomes 0.

The first processor may be further configured to reduce the driving time of the first light emitting diodes such that the average value of the first electric energy becomes the predetermined value, and/or increase a magnitude of the voltage applied to the cathodes of the first light emitting diodes such that the average value of the first electric energy becomes the predetermined value.

The first sub-screen may further include a memory configured to store at least one of information corresponding to the driving time of the first light emitting diodes and information on the cathode voltages of the first light emitting diodes for controlling the average value of the first electric energy to be the predetermined value. The first processor may be further configured to, based on information stored in the memory while operating in the dehumidification mode, control one or more of the driving time of the first light emitting diodes and the cathode voltages of the first light emitting diodes.

The plurality of sub-screens may include a second sub-screen. The second sub-screen mat include: a second sensor; a second display module comprising a plurality of second pixels; and a second processor configured to: acquire a second electric energy of the plurality of second pixels based on voltages across second light emitting diodes of the plurality of second pixels; and operate in the dehumidification mode based on humidity information acquired from the second sensor being greater than or equal to the predetermined threshold Operating in the dehumidification mode may include controlling one or more of a driving time of the second light emitting diodes and a voltage of cathodes of the second light emitting diodes such that an average value of the second electric energy is held at the predetermined value.

The first processor may be further configured to acquire information on the average value of the first electric energy based on the voltage across the first light emitting diodes measured during a predetermined time period, and the second processor may be further configured to acquire information on the average value of the second electric energy based on the voltage across the second light emitting diodes measured during the predetermined time period.

The first processor may be further configured to control one or more of the driving time of the first light emitting diodes and the voltage of the cathodes of the first light emitting diodes such that the average value of the first electric energy becomes 0, and the second processor may be further configured to control one or more of the driving time of the second light emitting diodes and the voltage of the cathodes of the second light emitting diodes such that the average value of the second electric energy becomes 0.

According to another aspect of the disclosure, a method for controlling a modular display apparatus including a sensor and a plurality of light emitting diodes, may include operating in a dehumidification mode based on humidity information acquired from the sensor being greater than or equal to a predetermined threshold; and controlling, while operating in the dehumidification mode, one or more of a driving time of the plurality of light emitting diodes and a voltage of cathodes of the light emitting diodes such that an average value of an electric energy acquired based on a voltage across the plurality of light emitting diodes is held at a predetermined value.

The method may further include acquiring information on the average value of the electric energy based on the voltage across the plurality of light emitting diodes measured during a predetermined time period.

The modular display apparatus may further include an integrated circuit (IC) electrically connected to the both ends of the plurality of light emitting diodes. The controlling may further include calculating, based on the voltage across the plurality of light emitting diodes measured during the predetermined time period by the IC circuit, an average value of the electric energy; and transmitting one or more of: a signal for controlling the driving time of the plurality of light emitting diodes to the IC such that the average value of the electric energy becomes the predetermined value; and a signal for controlling a voltage applied to the cathodes of the plurality of light emitting diodes to the IC such that the average value of the electric energy becomes the predetermined value.

The method may further include applying a forward voltage to the plurality of light emitting diodes during a first time period of the predetermined time period and applying a reverse voltage to the plurality of light emitting diodes during a second time period of the predetermined time period. The calculating the average value of the electric energy may include acquiring, through the IC, information on a first voltage across the plurality of light emitting diodes measured during the first time period and a second voltage across the plurality of light emitting diodes measured during the second time period; and calculating the average value of the electric energy based on the information on the first voltage and the second voltage.

The controlling may further include controlling one or more of the driving time of the plurality of light emitting diodes and the voltage of the cathodes of the plurality of light emitting diodes such that the average value of the electric energy becomes 0.

The controlling may include reducing the driving time of the plurality of light emitting diodes such that the average value of the electric energy becomes the predetermined value, and/or increasing a magnitude of the voltage applied to the cathodes of the plurality of light emitting diodes such that the average value of the electric energy becomes the predetermined value.

The method may further include storing one or more of information on the driving time of the plurality of light emitting diodes and information on the cathode voltages of the plurality of light emitting diodes for controlling the average value of the electric energy to the predetermined value. The controlling may include, based on information stored while operating in the dehumidification mode, controlling one or more of the driving time of the plurality light emitting diodes and the cathode voltages of the plurality of light emitting diodes.

DETAILED DESCRIPTION OF EXEMPLARY EMBODIMENTS

The terms used in the present disclosure and the claims are general terms selected in consideration of the functions of the various example embodiments of the present disclosure. However, such terms may be varied depending on an intention of those skilled in the art, a legal or technical interpretation, an emergence of a new technology, and the like. Also, there may be some terms arbitrarily selected by an applicant. Such terms may be construed according to meanings defined in the present specification, and may also be construed based on general contents of the present specification and a typical technical concept in the art unless the terms are not specifically defined.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings of the disclosure.

In describing example embodiments, detailed description of relevant known functions or components may be omitted if it would obscure the description of the subject matter.

Further, example embodiments will be described in detail below with reference to the accompanying drawings and contents described in the accompanying drawings, but the disclosure is not restricted or limited by the example embodiments.

Hereinafter, certain exemplary embodiments will now be explained in detail with reference to the accompanying drawings.

Figure 1A:
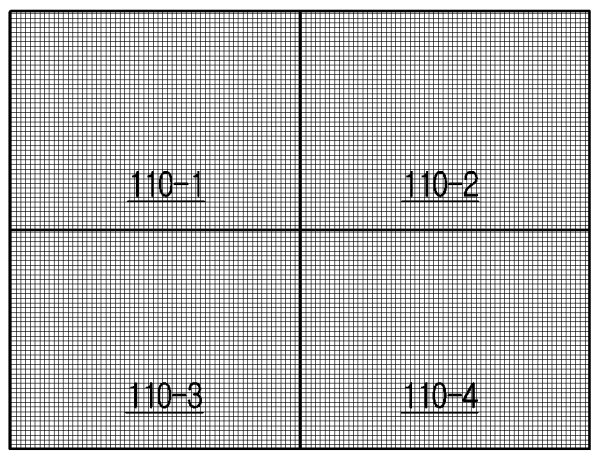
FIG. 1A is a plan view showing a modular display apparatus according to an embodiment.
Figure 1B:
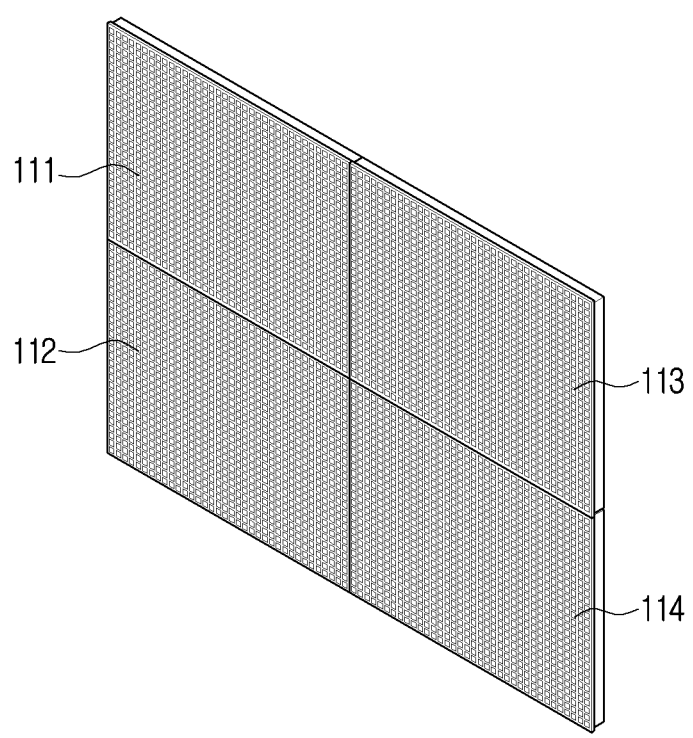
FIG. 1B is a perspective view illustrating one of a plurality of sub-screens constituting the modular display apparatus according to an embodiment.

FIG. 1A is a view showing a modular display apparatus according to an embodiment, and FIG. 1B is a view showing one of a plurality of display apparatuses constituting the modular display apparatus according to an embodiment.

Referring to FIG. 1A, the modular display apparatus 100 according to an embodiment may include a plurality of display apparatuses 110-1, 110-2, 110-3, and 110-4. Here, each of the display apparatuses 110-1, 110-2, 110-3, and 110-4 may be referred to as a sub-screen or a cabinet according to an embodiment.

Referring to FIG. 1B, the display apparatus 110-1 according to an embodiment may include one or a plurality of display modules.

For example, as shown in FIG. 1B, the display apparatus 110-1 according to the embodiment may include four display modules 111, 112, 113, and 114. Here, each of the display modules 111, 112, 113, and 114 may be physically connected to form one display.

Each of the display modules 111, 112, 113, and 114 may be implemented as an LED display module including an inorganic light emitting diode (LED).

Specifically, each of the display modules 111, 112, 113, and 114 may be implemented as an LED display module including a plurality of pixels in which red LED, green LED, and blue LED, which are sub-pixels, are implemented as one chip.

According to an embodiment, the LEDs described above may be micro LEDs. Here, a micro-LED may be an LED having a size of about 5 to 100 micrometers, and may be a micro-light emitting diode that emits light without a color filter.

The plurality of pixels may be electrically connected to a driver integrated circuit (IC). In addition, the driver IC may be electrically connected to a timing controller, and may control light emission of the plurality of pixels under the control of the timing controller. Specifically, the timing controller may transmit image data for controlling the plurality of pixels to the driver IC, the driver IC may convert the image data into analog data for controlling the plurality of pixels, and output current or apply voltage to the plurality of pixels according to analog data. In addition, each of the plurality of pixels may emit light based on the current output by the driver IC or the voltage applied by the driver IC.

For this operation, the sub-screen 110-1 may include a power supply unit (e.g., a switched-mode power supply (SMPS)) that supplies power to a plurality of components included in the sub-screen 110-1.

According to an embodiment, the plurality of pixels may be arranged in a matrix form (e.g., M*N, where M and N are natural numbers). Specifically, the matrix may be in a form of a rectangular array (e.g., M=N, where M and N are natural numbers, 16*16 arrays, 24*24 arrays, etc.), as well as a different array (e.g., M≠N, where M and N are natural numbers).

The LED display module described above is only an example embodiment, and the display module may be implemented with various display modules such as organic LED (OLED) and active-matrix OLED (AMOLED). Hereinafter, for convenience of description, it is assumed that the display module according to an embodiment is an LED display module.

FIG. 1B, the display apparatus 110-1 according to an embodiment may be implemented in a form in which the plurality of display modules 111, 112, 113, and 114 are combined in a 2*2 array.

However, here, the 2*2 array of LED display modules is only an example, and an arrangement type and the number of LED display modules may be different according to other embodiments.

The display apparatus 110-1 may be connected to another adjacent display apparatus to implement the modular display apparatus 100. As an example, each of the plurality of display apparatuses 110-1, 110-2, 110-3 and 110-4 may be connected to each other in a daisy chain, but the disclosure is not limited thereto. Here, the modular display apparatus 100 including the plurality of display apparatuses may be referred to as a wall display, a video wall, or the like according to an embodiment.

For example, as shown in FIG. 1A, the plurality of sub-screens 110-1, 110-2, 110-3 and 110-4 may be connected in a 2*2 form. The 2*2 array is an example, and the arrangement type and number of the plurality of display apparatuses included in the modular display apparatus 100 may be different according to other embodiments.

The modular display apparatus 100 may display an image through the plurality of sub-screens 110-1, 110-2, 110-3 and 110-4. Here, the image may be an image received from an external device (e.g., set-top box, computer, server, etc.), as well as an image previously stored in the modular display apparatus 100. Specifically, the plurality of sub-screens 110-1, 110-2, 110-3 and 110-4 may respectively display a plurality of divided images obtained by dividing one image. For this operation, the plurality of sub-screens 110-1, 110-2, 110-3 and 110-4 may identify image data corresponding to identification information of each sub-screen 110-1, 110-2, 110-3 or 110-4 from the input image data based on the identification information set in each sub-screen.

Here, the identification information of each sub-screen 110-1, 110-2, 110-3 or 110-4 may be predetermined for each sub-screen based on the arrangement type of the plurality of sub-screens (or location information of the plurality of display apparatuses). For example, as shown in FIG. 1A, when the plurality of sub-screens 110-1, 110-2, 110-3, and 110-4 are arranged in a 2*2 form, identification information for displaying an image of a first area (e.g., upper left area) among images corresponding to the input image data may be set in a first sub-screen 110-1, identification information for displaying an image of a second area (e.g., upper right area) among images corresponding to the input image data may be set in a second sub-screen 110-2, identification information for displaying an image of a third area (e.g., lower left area) among images corresponding to the input image data may be set in a third sub-screen 110-3, and identification information for displaying an image of a fourth area (e.g., lower right area) among images corresponding to the input image data may be set in a fourth sub-screen 110-4.

Thereafter, the plurality of sub-screens 110-1, 110-2, 110-3 and 110-4 may display an image by controlling light emission of the plurality of pixels based on the identified image data. Accordingly, the modular display apparatus 100 of the disclosure may display one entire image in which divided images displayed by the plurality of sub-screens 110-1, 110-2, 110-3 and 110-4 are combined.

The plurality of sub-screens 110-1, 110-2, 110-3 and 110-4 may receive image data and identify image data corresponding to identification information from the image data, but this is only an embodiment, and according to another embodiment, an image data corresponding to each sub-screens 110-1, 110-2, 110-3 and 110-4 may be identified by a controller 130 to be described below. Specifically, the controller 130 may identify image data corresponding to each sub-screen 110-1, 110-2, 110-3 or 110-4 (i.e., data for displaying divided images) from the input image data based on the identification information set in each sub-screens 110-1, 110-2, 110-3 or 110-4, and transmit each of the identified image data to the plurality of sub-screens 110-1, 110-2, 110-3 and 110-4. For example, the controller 130 may identify a first to fourth image data for displaying the first to fourth areas based on identification information set in each sub-screen 110-1, 110-2, 110-3 or 110-4, transmit the first image data to the first sub-screen 110-1, transmit the second image data to the second sub-screen 110-2, transmit the third image data to the third sub-screen 110-1. 3, and transmit the fourth image data to the fourth sub-screen 110-4. In this case, each sub-screens 110-1, 110-2, 110-3 or 110-4 may display a divided image based on the image data received from the controller 130, and the modular display apparatus 100 may display one entire image in which the divided images are combined.

Figure 2:
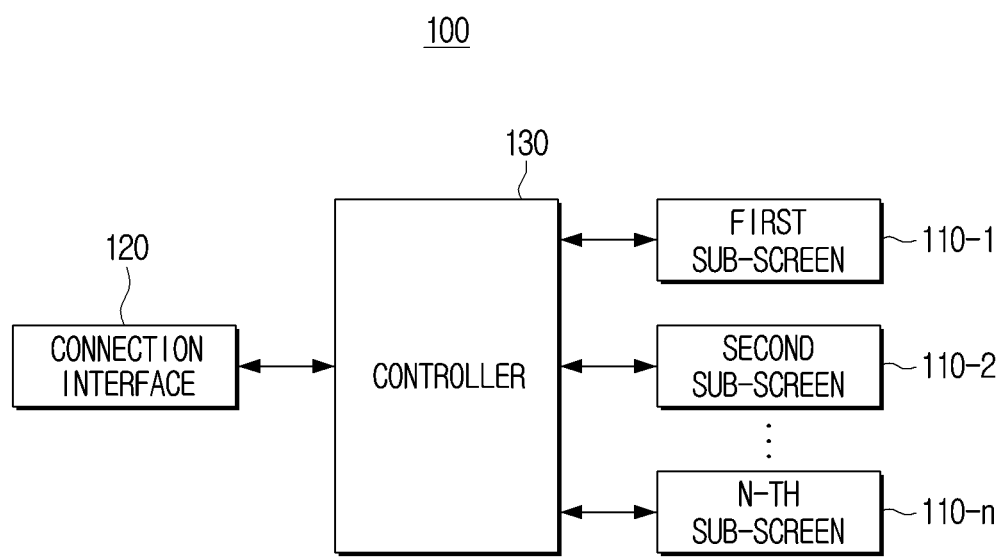
FIG. 2 is a block diagram of a modular display apparatus according to an embodiment.

FIG. 2 is a block diagram showing a modular display apparatus according to an embodiment.

Referring to FIG. 2, a modular display apparatus 100 according to an embodiment may include a connection interface 120, a plurality of sub-screen 110-1, 110-2 . . . 110-n, and a controller 130.

The connection interface 120 may be a high-definition multimedia interface (HDMI) input terminal, a component input terminal, an RGB terminal, a DVI terminal, a DP terminal, a Thunderbolt terminal or a USB input terminal, or the like. The modular display apparatus 100 may receive image data, broadcast data, audio data, or the like from an image supply device through the connection interface 120.

Here, the image supply device may be, for example, an electronic device such as a sending box, or the like that transmits image data received from a server or the like to the modular display apparatus 100 through the connection interface 120, but is not limited thereto, and may be a variety of electronic devices such as set-top box, PC, or the like.

The controller 130 may control overall operations of the display apparatus 100. The controller 210 may, for example, control a number of hardware or software elements connected to the controller 130 by driving an operating system or application program, and perform various data processing and calculations. Further, the controller 130 may load and process a command or data received from at least one of the other elements to a volatile memory and store diverse data in a non-volatile memory.

The controller 130 may include a central processing unit (CPU) or an application processor (AP). In addition, the controller 130 may be electrically connected to each processor included in the plurality of sub-screens 110-1, 110-2 . . . 110-n to transmit and receive various data such as image data, control data, or the like.

The controller 130 may control the display apparatus 100 display an image through the plurality of sub-screens 110-1, 110-2, . . . 110-n.

According to an embodiment, each of the plurality of sub-screens 110-1, 110-2 . . . and 110-n may include a processor, a driver IC, a plurality of pixels including a plurality of light emitting diodes of different colors, and a power supply unit.

In addition, a processor included in the plurality of sub-screens 110-1, 110-2 . . . and 110-n may receive image data from the controller 130. In addition, when the image data is received, based on the identification information set in the sub-screens 110-1, 110-2 . . . and 110-n, the processor may identify an image data corresponding to the sub-screens 110-1, 110-2 . . . 110-n. For example, as shown in FIG. 1A, when the plurality of sub-screens 110-1, 110-2, 110-3 and 110-4 are arranged in a 2*2 form, ID 1 may be set for the first sub-screen 110-1, ID 2 may be set for the second sub-screen 110-2, ID 3 may be set in the third sub-screen 110-3, and ID 4 may be set for the fourth sub-screen 110-4. In this case, the processor included in the first sub-screen 110-1 may identify the first image data corresponding to ID 1 from among the image data and transmit the first image data to the driver IC. In this case, a driver IC of the first sub-screen 110-1 may convert the first image data into a first data current (or first data voltage), which is analog data, supply the first data current (or first data voltage) to a plurality of pixels, and display the first image corresponding to the first image data. Similarly, the second to fourth sub-screens 110-2, 110-3, and 110-4 may also, based on the identification information of the sub-screens 110-2, 110-3 and 110-4, display the second to fourth images corresponding to the second to fourth image data.

At least one of the plurality of sub-screens 110-1, 110-2 . . . 110-n may operate in a dehumidification mode based on a humidity measured by a sensor. Hereinafter, it will be described with reference to FIG. 3.

Figure 3:
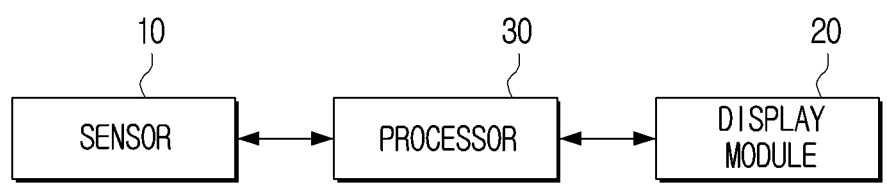
FIG. 3 is a block diagram of a display apparatus of a sub-screen according to an embodiment.

FIG. 3 is a block diagram illustrating a sub-screen according to an embodiment.

Although a configuration of one sub-screen 110-1 among a plurality of sub-screens 110-1, 110-2 . . . 110-n constituting the modular display apparatus 100 will be described as an example with reference to FIG. 3, the following technical idea will be regarded as applicable to the plurality of sub-screens 110-1, 110-2 . . . 110-n constituting the modular display apparatus 100.

Referring to FIG. 3, a sub-screen 110-1 may include a sensor 10, a display module 20, and a processor 130.

The sub-screen 110-1 according to an embodiment may include at least one sensor 10. The sensor 10 may be a humidity sensor for measuring humidity and/or a temperature sensor for measuring temperature.

Figure 4:
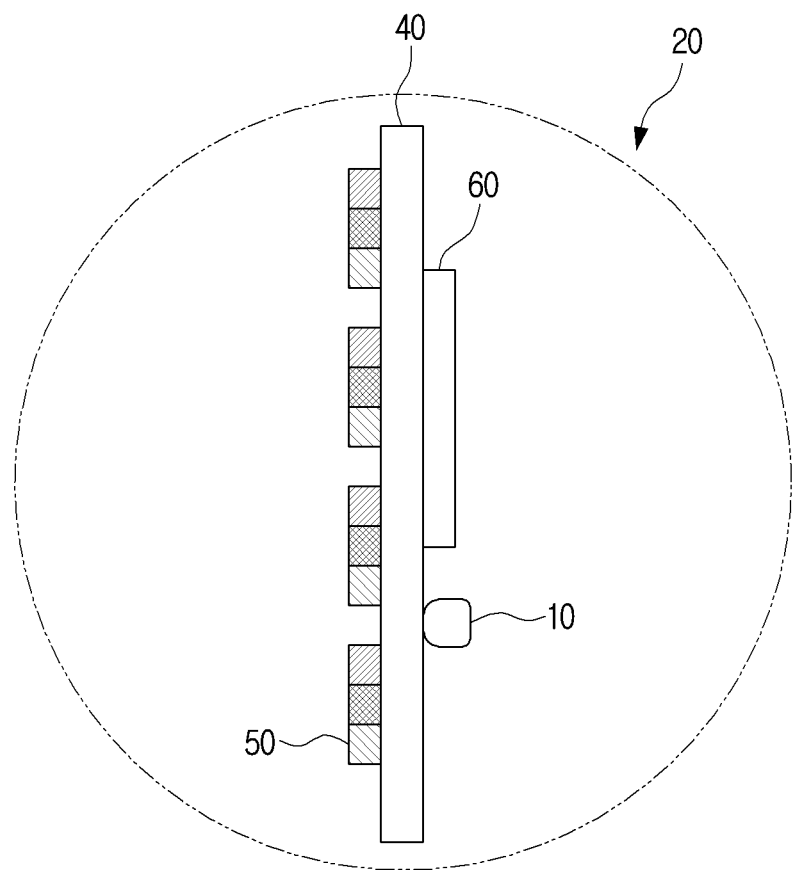
FIG. 4 is a side view of a display module according to an embodiment.

The sensor 10 may be located inside the sub-screen 110-1 and may measure humidity and/or temperature around the display module 30. As an example, referring to FIG. 4, which shows a side surface of the display module 20, and the display module 20 may include a substrate 40, and a first surface of the substrate 40 may include a plurality of pixels 50. Here, a pixel 50 may be implemented as a single chip including a red LED, a green LED, and a blue LED, which are sub-pixels, as well as a red LED, green LED, and blue LED disposed adjacent to each other. Further, a second surface of the substrate 40 may include a driver IC 60 for controlling a plurality of pixels 50 and at least one sensor 10 for measuring humidity and/or temperature of the display module 20. A position of the sensor 10 described above is an embodiment, and the sensor 10 may be disposed outside the sub-screen 110-1 or at various locations such as on an external electronic device that transmits image data to the modular display apparatus 100.

The processor 30 may control the overall operation of the sub-screen 100-1. For this operation, the processor 30 may include timing controller or a field programmable gate array (FPGA).

The processor 30 may obtain humidity information and/or temperature information from the sensor 10. For this operation, the processor 30 may be electrically connected to the sensor 10 to receive humidity information and/or temperature information generated by the sensor 10 from the sensor 10. Further, the processor 30 may control the display module 20 to display a humidity value corresponding to the humidity information and/or a temperature value corresponding to the temperature information based on the humidity information and/or temperature information obtained from the sensor 10.

The processor 30 may operate in a dehumidification mode when it is identified that the humidity value included in the humidity information is equal to or greater than a predetermined threshold humidity or the temperature value included in the temperature information is equal to or lower than the predetermined threshold temperature. In this case, the processor 30 may control the display module 30 to display a screen indicating that it is operating in the dehumidification mode.

The dehumidification mode may be a mode for controlling driving of a plurality of light emitting diodes included in the display module 30 in order to lower a humidity inside the sub-screen 100-1 to less than the predetermined threshold, and when it is identified that the humidity value included in the humidity information is greater than or equal to the predetermined threshold humidity, or when it is identified that the temperature value included in the temperature information is less than or equal to the predetermined threshold temperature, the processor 30 may output an electrical signal to a plurality of light emitting diodes constituting the display module 30 to drive the plurality of light emitting diodes. However, this is an embodiment, and the dehumidification mode may be executed when a dehumidification mode execution is requested from a remote control apparatus as a user command for selecting a button provided on the modular display apparatus 100 is input or a button for executing the dehumidification mode provided in the remote control apparatus is selected.

Figure 5:
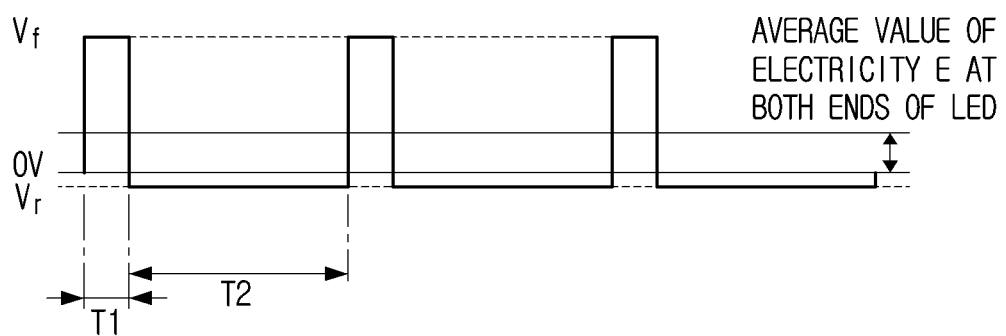
FIG. 5 is a graph showing a voltage across both ends of a light emitting diode during operation in a dehumidification mode according to an embodiment.

As an example, referring to FIG. 5, when the dehumidification mode is executed, the processor 30 may apply a forward voltage Vf to the plurality of light emitting diodes of the display module 30 during a first time period (T1 period) to drive the plurality of light emitting diodes. Specifically, the processor 30 may control a driver IC electrically connected to the plurality of light emitting diodes to apply the forward voltage to the plurality of light emitting diodes of the display module 30 during the first time period, and the driver IC may apply the forward voltage to the plurality of light emitting diodes according to the control of the processor 30 to drive the plurality of light emitting diodes. In this case, a temperature around the display module 30 increases due to heat generated by the plurality of light emitting diodes, and thus, a humidity around the display module 30 may decrease.

In addition, the processor 30 may apply a reverse voltage Vr to the plurality of light emitting diodes during a second time period (T2 period). Specifically, the processor 30 may control the driver IC electrically connected to the plurality of light emitting diodes to apply the reverse voltage to the plurality of light emitting diodes of the display module 30 during the second time period, and the driver IC may apply the reverse voltage to the plurality of light emitting diodes according to the control of the processor 30.

Further, the processor 30 may repeatedly apply the forward voltage to the plurality of light emitting diodes of the display module 30 during the first time period after the second time period passes, thereby lowering the humidity around the display module 30.

The processor 30 may obtain information on an average value of electric energy based on voltages across both ends of the light emitting diodes measured during a predetermined time period (which may be a sum of the first time period and the second time described above).

Specifically, both ends of the light emitting diodes may be connected to the IC circuit for voltage measurement, and the processor 30 may receive information about the voltages across both ends of the light emitting diodes measured by the IC circuit, during the predetermined time period, from the IC circuit.

Figure 6A:
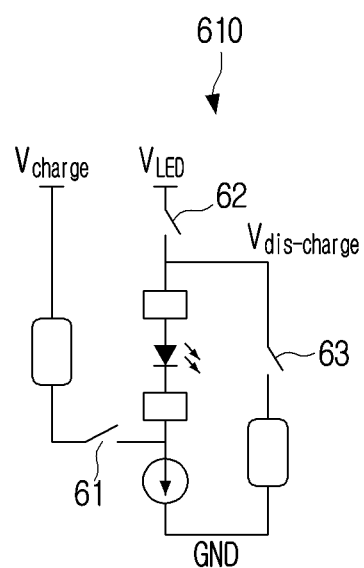
FIG. 6A is a diagram of an IC circuit when driving a light emitting diode by a sink method according to an embodiment.

As an example, referring to FIG. 6A, when the sub-screen 110-1 drives a light emitting diode in a sync manner, an IC circuit 610 may transmit information on the voltage across both ends of the light emitting diodes measured during the first time period (e.g., a period where a first switch 61 is open, and a second switch 62 and a third switch 63 are short-circuited) in which a forward voltage is applied to the light emitting diode to the processor 30, and transmit information on the voltage across both ends of the light emitting diodes measured during the second time period (e.g., a period where the first switch 61 and the second switch 62 are short-circuited, and the third switch 63 is open) in which a reverse voltage is applied to the light emitting diode to the processor 30.

Figure 6B:
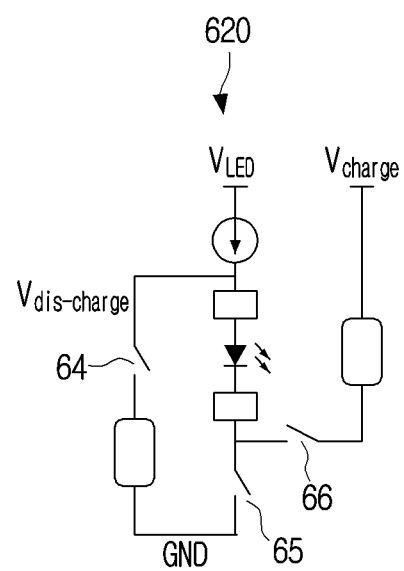
FIG. 6B is a diagram of an IC circuit when driving a light emitting diode by a source method according to an embodiment.

Alternatively, referring to FIG. 6B, when the sub-screen 110-1 drives the light emitting diode in a source manner, a IC circuit 620 may transmit information on the voltage across both ends of the light emitting diodes measured during the first time period (e.g., a period where a fourth switch 64 and a fifth switch 65 are short-circuited, and a sixth switch 66 is open) in which a forward voltage is applied to the light emitting diode to the processor 30, and transmit information on the voltage across both ends of the light emitting diodes measured during the second time period (e.g., a period where the fourth switch 64 and the fifth switch 65 are open, and the sixth switch 66 is short-circuited) in which a reverse voltage is applied to the light emitting diode to the processor 30.

Further, the processor 30 may calculate an average electric energy value of the light emitting diode based on the voltage across both ends of the light emitting diode measured during the first time period (hereinafter referred to as a first voltage) and the voltage across both ends of the light emitting diode measured during the second time period (hereinafter referred to as a second voltage). Specifically, the processor 30 may calculate a first electrical energy through a calculation of the first time period and the first voltage, and calculate a second electrical energy through a calculation of the second time period and the second voltage. Here, the calculation may be an integral calculation using time and voltage as factors. In addition, the processor 30 may calculate a difference between the first electrical energy and the second electrical energy as an average value of electrical energy of the light emitting diode. However, this is only an embodiment, and embodiments may further include an integration circuit for calculating an average electric energy value of the light emitting diode, and the processor 30 may obtain the average electric energy value of the light emitting diode from the integrating circuit. For this operation, the processor 30 may be electrically connected to the integrating circuit, and the integrating circuit may output an average electric energy value of the light emitting diode calculated under a control of the processor 30 to the processor 30. Specifically, the integrating circuit may calculate a first electric energy through an integral calculation of the first time period in which a forward voltage is applied to the light emitting diode under control of the processor 30, and the voltage across both ends of the light emitting diode measured during the first time period, and may calculate a second electric energy through an integral calculation of the second time period in which a reverse voltage is applied to the light emitting diode, and the voltage across both ends of the light emitting diode measured during the second time period.

Since a magnitude of the forward voltage is generally greater than that of the reverse voltage, an average value of the electric energy calculated here may have a value larger than 0 by a certain magnitude or more, as shown in FIG. 5.

Accordingly, if moisture around the display module 30 is not sufficiently removed, metal ions of an anode terminal of the light emitting diode may be moved to a cathode terminal by a magnetic field even while operating in the dehumidification mode, and a migration phenomenon accordingly may occur.

In order to prevent such migration from occurring, the processor 30 may control at least one of a driving time of the light emitting diode and a voltage of the cathode of the light emitting diode such that the average value of the electric energy obtained based on the voltage across both ends of the light emitting diode becomes a predetermined value. Here, the predetermined value may be 0, but is not limited thereto.

Figure 7:
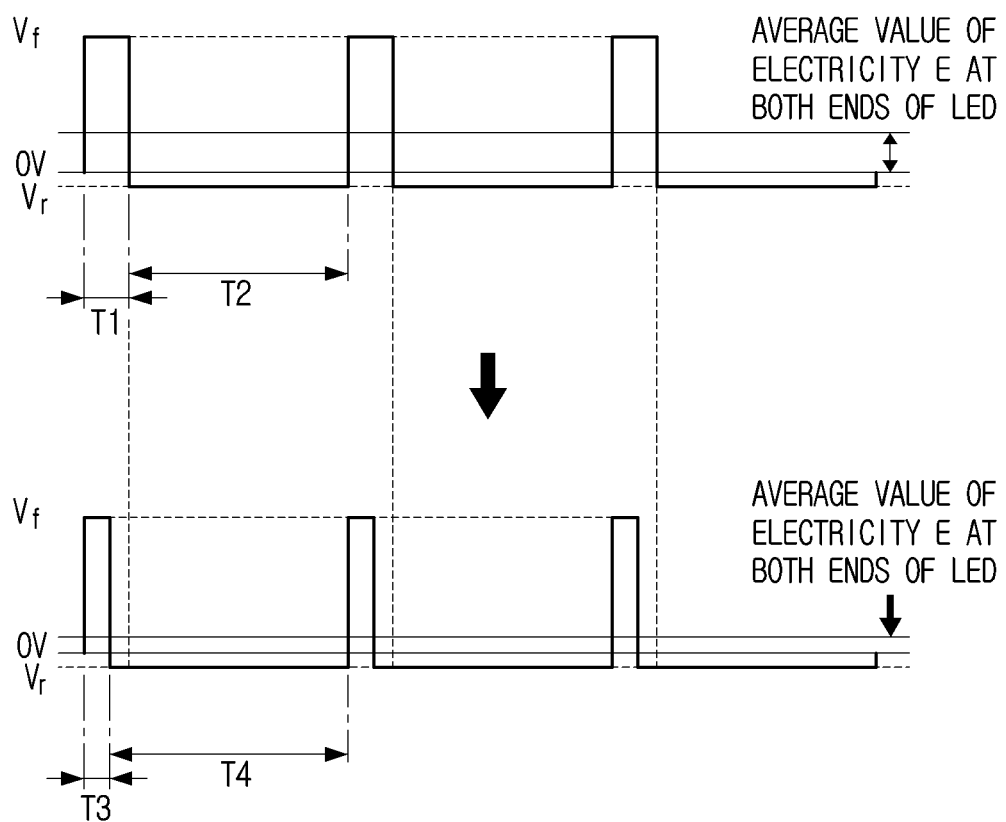
FIG. 7 is a diagram of an embodiment of controlling a driving time of a light emitting diode according to an embodiment.

Specifically, the processor 30 may transmit a signal for controlling the driving time of the light emitting diode to the IC circuit such that the average electric energy value of the light emitting diode becomes the predetermined value (or a value within an error range from the predetermined value), and the IC circuit may control the driving time of the light emitting diode under the control of the processor 30. As an example, the processor 30 may reduce the driving time of the light emitting diode such that the average value of electric energy of the light emitting diode becomes the predetermined value (e.g., 0). Here, the driving time of the light emitting diode may be a time for applying a forward voltage to the light emitting diode. For example, referring to FIG. 7, the processor 30 may apply a forward voltage to the light emitting diode for a time T3 less than time T1, which is the first time described above, and apply a reverse voltage to the light emitting diode for a time T4 longer than time T2, which is the second time described above.

Time T3 and time T4 are times for controlling an average value of electric energy of the light emitting diode to a predetermined value, and may be determined based on a magnitude of the forward voltage and a magnitude of the reverse voltage. Specifically, the processor 30 may determine T3 and T4 in which a difference between a value calculated by integrating the magnitude of the forward voltage and the variable T3, and a value calculated by integrating the magnitude of the reverse voltage and the variable T4 becomes a predetermined value (e.g., 0). As described above, by applying a forward voltage to the light emitting diode for a time period T3 less than the time T1, the electric energy based on the time period T3 and the first voltage may be smaller than the electric energy based on the time period T1 and the first voltage. The average value of the electric energy of the light emitting diode measured during a predetermined time (this may be a sum of T3 time and T4 time) may be a predetermined value (e.g., 0).

Figure 8:
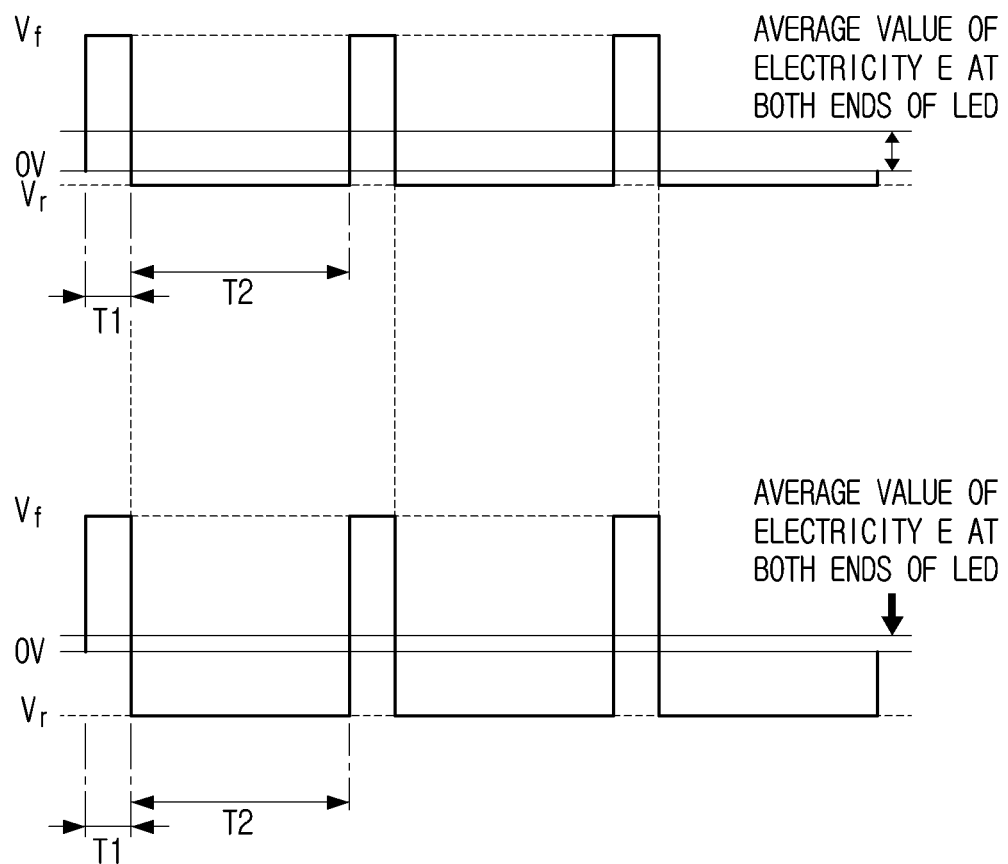
FIG. 8 is a diagram of an embodiment of controlling a cathode voltage of a light emitting diode according to an embodiment.

Alternatively, the processor 30 may transmit a signal for controlling a voltage applied to the cathode of the light emitting diode to the IC circuit such that the average value of the electric energy of the light emitting diode becomes a predetermined value (or a value within an error range from the predetermined value). In addition, the IC circuit may control a voltage applied to the cathode of the light emitting diode under the control of the processor 30. As an example, the processor 30 may increase a magnitude of the cathode voltage applied to the light emitting diode such that the average value of the electric energy obtained based on the voltage across both ends of the light emitting diode becomes the predetermined value. For example, referring to FIG. 8, the processor 30 may increase a magnitude of the reverse voltage applied to the light emitting diode during the second time described above from Vr to Vr2. Here, the reverse voltage Vr2 may be determined based on the forward voltage Vf and T1 and T2. Specifically, the processor 30 may determine Vr2, in which a difference between a value calculated by integrating the forward voltages Vf and T1 and a value calculated by integrating the variables Vr2 and T2 becomes a predetermined value (e.g., 0). In this case, the electric energy based on the T2 time period and the voltage Vr2 may be greater than the electric energy based on the T2 time period and the voltage Vr, and thus the average value of the electric energy of the light emitting diode measured during a predetermined time (this may be a sum of the T1 time and the T2 time) may be a predetermined value (e.g., 0).

As such, by controlling the average value of the electric energy obtained based on the voltage across both ends of the light emitting diode to a predetermined value (e.g., 0), the disclosure may prevent the migration phenomenon in which metal ions are precipitated and moved due to a difference in electric energy between both ends of the light emitting device.

In the above, it has been described that at least one of a driving time of the light emitting diode and a cathode voltage of the light emitting diode may be adaptively controlled based on an average electric energy value based on the voltage across the light emitting diode. According to an embodiment, this may be referred to as feedback method control in that the driving time of the light emitting diode or the cathode voltage of the light emitting diode are controlled based on the actually measured voltage across both ends of the light emitting diode.

However, this is only an embodiment, and the sub-screen 110-1 may store at least one of information on a driving time of the light emitting diode for controlling the average value of the electric energy of the light emitting diode to a predetermined value, and information on the cathode voltage of the light emitting diode in a memory, and control at least one of a driving time of the light emitting diode and the cathode voltage of the light emitting diode stored in the memory. Depending on the embodiment, this may be referred to as a feed forward method control.

Specifically, when operating in the dehumidification mode as humidity above a predetermined threshold is sensed by the sensor 10, the processor 30 may control at least one of the driving time of the light emitting diode and the cathode voltage of the light emitting diode based on at least one of information on the driving time of the light emitting diode stored in the memory and information on the cathode voltage of the light emitting diode. Here, the driving time of the light emitting diode may be the T3 time described above, and the cathode voltage of the light emitting diode may be the Vr2 described above, but is not limited thereto.

By storing information on the driving time of the light emitting diode or information on the cathode voltage of the light emitting diode in advance, the average value of the electric energy of the light emitting diode may be controlled to a predetermined value (e.g., 0) without a separate calculation for calculating the electric energy of the light emitting diode.

Figure 9:
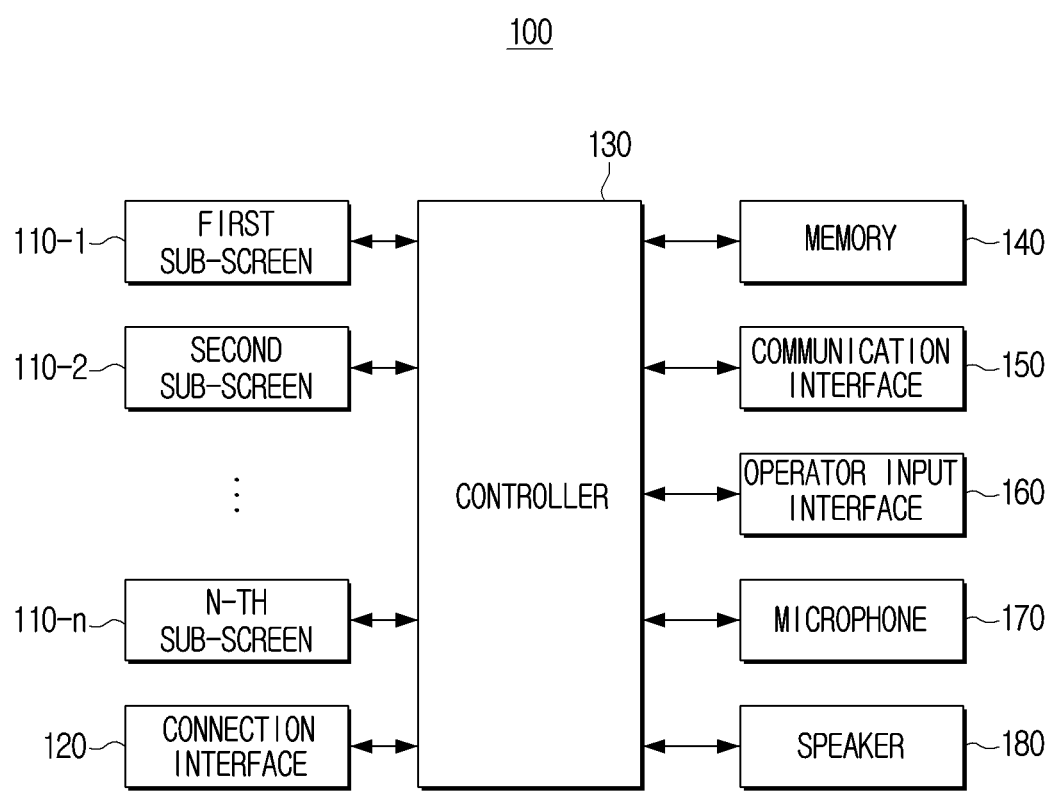
FIG. 9 is a detailed block diagram of a modular display apparatus according to an embodiment.

FIG. 9 is a detailed block diagram illustrating a modular display apparatus according to an embodiment.

Referring to FIG. 9, the modular display apparatus 100 according to an embodiment of the disclosure may include a first sub-screen 110-1, a second sub-screen 110-2 . . . n-th sub-screen 110-n, a connection interface 120, a memory 140, a communication interface 150, an operator input interface 160, a microphone 170, a speaker 180, and a controller 130. Hereinafter, portions overlapping with the above description will be omitted or abbreviated.

The memory 140 may store an operating system (OS) for controlling the overall operation of components of the modular display apparatus 100 and commands or data related to components of the modular display apparatus 100.

Accordingly, the controller 130 may control a plurality of hardware components or software elements of the modular display apparatus 100 by using diverse commands or data in the memory 140, load and process the command or data received from at least one of the other components in a volatile the memory, and store diverse data in a non-volatile the memory.

In particular, the memory 140 may store at least one of information on a driving time of the light emitting device and information on a cathode voltage of the light emitting device for controlling an average value of electric energy of light emitting diodes included in each display apparatus for each of the plurality of sub-screens 110-1, 110-2 . . . 110-n as a predetermined value. The memory 140 may be included in each of the plurality of sub-screens 110-1, 110-2 . . . 110-n, as well as an area inside the modular display apparatus 100 capable of electrically communicating with a processor included in each sub-screen 110-1, 110-2 . . . 110-n.

The memory 140 may be implemented with various types of storage media. For example, the memory 140 may be implemented as a nonvolatile memory device such as a read only memory (ROM), a programmable read only memory (PROM), an erasable programmable read only memory (EPROM), a flash memory, or may be implemented as a volatile memory device such as random access memory (RAM), a storage device such as a hard disk, an optical disk, or the like.

The communication interface 150 may perform communication with an external apparatus based on various types of communication methods using various communication circuitry. For this purpose, the communication interface 150 may include at least one communication module among a near field wireless communication module and a wireless LAN communication module. In this example, the near field wireless communication module is a communication module which performs data communication wirelessly with an external apparatus 200 located nearby, which may be, for example, a Bluetooth module, a ZigBee module, an NFC module, and etc. In addition, the wireless communication module refers to the module which is connected to an external network according to a wireless communication protocol such as Wi-Fi, IEEE and the like, and performs a communication.

In addition to the above, the communication interface 150 may include a mobile communication module which accesses a mobile communication network according to a variety of mobile communication standards such as 3rd generation (3G), 3rd Generation Partnership Project (3GPP), Long Term Evolution (LTE) and $5^{th}$ generation (5G), or the like. In addition, the communication interface 150 may include at least one of a wired communication module, which includes a universal serial bus (USB), Institute of Electrical and Electronics Engineers (IEEE) 1394, RS-232, etc., or may include a broadcast receiving module that receives TV broadcasts.

In the above, it has been described that the processor 30 may determine whether to execute the dehumidification mode based on humidity information and/or temperature information measured by the sensor 10, but this may be determined by an external server. For this operation, the controller 130 may control the communication interface 150 to transmit the humidity information and/or temperature information measured by the sensor 10 to the server, and receive a signal requesting to execute the dehumidification mode from the server through the communication interface 150. In this case, the controller 130 may transmit a signal requesting to execute the dehumidification mode to a processor included in each sub-screen according to the dehumidification mode request.

The controller 130 may control the overall operation of the modular display apparatus 100.

For example, when humidity information and/or temperature information is received from the sensor 10, the controller 130 may control the plurality of sub-screens 110-1, 110-2 . . . 110-n to display humidity information and/or temperature information. For example, when first humidity information is received from the first sub-screen 110-1 and second humidity information is received from the second sub-screen 110-2, the controller 130 may display a humidity value corresponding to the first humidity information through the first sub-screen 110-1, and display a humidity value corresponding to the second humidity information through the second sub-screen 120-2.

In addition, the controller 130 may control the plurality of sub-screens 110-1, 110-2 . . . 110-n to display a screen indicating that the dehumidification mode is being operated. For example, when the first sub-screen 110-1 of the plurality of sub-screens 110-1, 110-2 . . . 110-n is operating in the dehumidification mode, the controller 130 may display a screen indicating that it is operating in the dehumidification mode through the first sub-screen 110-1.

However, this is only an embodiment, and the displaying humidity information and/or temperature information and the screen indicating that it is being operated in the dehumidification mode may be performed by a processor included in each sub-screen.

The operator input interface 160 may be implemented as a touch screen, a touch pad, a key button, a keypad, or the like. For example, the operator input interface 160 may be a button for executing the dehumidification mode.

The microphone 170 may receive a user voice. Here, the user voice may be a voice for executing a specific function of the modular display apparatus 100. As an example, the user voice may be a user voice requesting execution of the dehumidification mode.

When the user voice is received through the microphone 170, the controller 130 may analyze the user voice through a speech to text (STT) algorithm and provide response information corresponding to the user voice. Here, the response information may be information received through an external server as well as information generated by the modular display apparatus 100 itself.

The speaker 180 may include various audio output circuitry and may be configured to output various kinds of alarm sounds or voice messages in addition to various audio data on which various processing operations such as decoding, amplification, and noise filtering are performed by an audio processor. In addition, the speaker 180 may output various alarm sounds or voice messages.

The connection interface 120 may further include a USB port to which a USB connector is connected, various external input ports for connecting various external terminals such as a headset, mouse, and LAN, and a Digital Multimedia Broadcasting (DMB) chip that receives and processes a DMB signal.

In addition, the modular display apparatus 100 may further include a broadcast receiver for receiving broadcast signals by wire or wirelessly from a broadcasting station or satellite, a signal separator for separating the broadcast signal received from the broadcast receiver into a video signal, an audio signal, and an additional information signal, an A/V processor (not shown) for performing video decoding and video scaling on an image signal and audio decoding on an audio signal, or the like.

Figure 10:
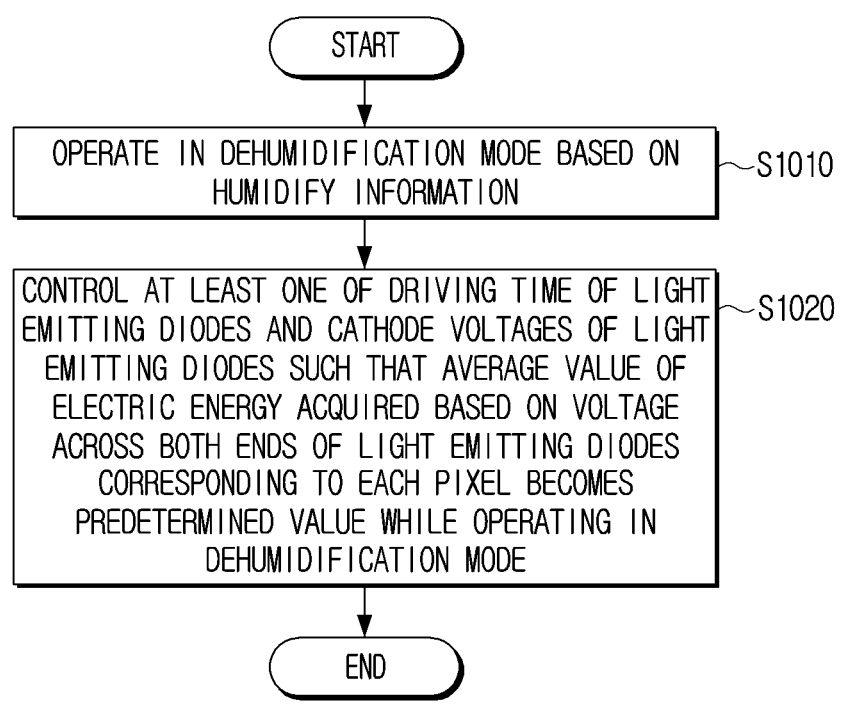
FIG. 10 is a flowchart of a method of controlling a modular display apparatus according to an embodiment.

FIG. 10 is a flowchart showing a method for controlling a modular display apparatus according to an embodiment.

The modular display apparatus 100 may operate in a dehumidification mode (S1010) based on humidity information acquired from a sensor. Specifically, each of the plurality of sub-screens constituting the modular display apparatus 100 may include a sensor, and may operate in the dehumidification mode based on humidity information obtained from the sensor.

In addition, the modular display apparatus 100 may control at least one of a driving time of the light emitting diodes and a voltage of a cathode of the light emitting diodes (S1020), such that an average value of an electric energy obtained based on the voltage across both ends of the light emitting diodes corresponding to each pixel becomes a predetermined value during operation in the dehumidification mode.

Each sub-screen of the modular display apparatus 100 may measure the voltage across both ends of the light emitting diodes during the predetermined time period, and calculate electrical energy corresponding to the voltage across both ends of the light emitting diodes measured during the predetermined time period. In addition, each display apparatus may control at least one of the driving time of the light emitting diodes and the voltage of the cathode of the light emitting diodes such that the average value of the electric energy becomes zero. For example, each display apparatus may reduce the driving time of the light emitting diodes or may increase a magnitude of the voltage applied to the cathode of the light emitting diodes such that the average value of electric energy becomes 0. However, this is only an embodiment, and according to other embodiments, each sub-screen may increase the driving time of the light emitting diodes or decrease the magnitude of the voltage applied to the cathode of the light emitting diodes such that the average value of electrical energy becomes 0.

The methods according to the above-described example embodiments may be realized as software or applications that may be installed in the existing electronic apparatus.

Further, the methods according to the above-described example embodiments may be realized by upgrading the software or hardware of the existing electronic apparatus.

In addition, various exemplary embodiments as described above may be performed through an embedded server provided in the acoustic output device or a server outside the acoustic output device.

A non-transitory computer readable medium in which a program sequentially performing the controlling method is stored may be provided.

The non-transitory computer readable recording medium refers to a medium that stores data and that can be read by devices. In detail, the above-described various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

Although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims. Accordingly, such modifications, additions and substitutions should also be understood to fall within the scope of the present disclosure.

What is claimed is:

1. A modular display apparatus comprising a plurality of sub-screens comprising a first sub-screen, the first sub-screen comprising:
    a first sensor;
    a first display module comprising a plurality of first pixels; and
    a first processor configured to:
        acquire a first electric energy of the plurality of first pixels based on voltages across first light emitting diodes of the plurality of first pixels; and
        operate in a dehumidification mode based on humidity information acquired from the first sensor being greater than or equal to a predetermined threshold,
        wherein operating in the dehumidification mode comprises controlling one or more of a driving time of the first light emitting diodes and a voltage of cathodes of the first light emitting diodes such that an average value of the first electric energy is held at a predetermined value.

2. The modular display apparatus of claim 1, wherein the first processor is further configured to acquire information on the average value of the first electric energy the voltage across the first light emitting diodes measured during a predetermined time period.

3. The modular display apparatus of claim 2, further comprising:
    an integrated circuit (IC) electrically connected to both ends of the first light emitting diodes,
    wherein the first processor is further configured to:
        calculate, based on the voltage across the first light emitting diodes measured during the predetermined time period by the IC, the average value of the first electric energy; and
        transmit one or more of:
            a first signal for controlling the driving time of the first light emitting diodes to the IC such that the average value of the first electric energy becomes the predetermined value; and
            a second signal for controlling a voltage applied to the cathodes of the first light emitting diodes to the IC such that the average value of the first electric energy becomes the predetermined value.

4. The modular display apparatus of claim 3, wherein the predetermined time period comprises a first time period and a second time period, and
wherein the first processor is further configured to:
apply a forward voltage to the first light emitting diodes during the first time period;
apply a reverse voltage to the first light emitting diodes during the second time period;
acquire, through the IC, information on a first voltage across the first light emitting diodes measured during the first time period and a second voltage across both ends of the first light emitting diodes measured during the second time period; and
calculate the average value of the first electric energy based on the information on the first voltage and the second voltage.

5. The modular display apparatus of claim 1, wherein the first processor is further configured to control one or more of the driving time of the first light emitting diodes and the voltage of the cathodes of the first light emitting diodes such that the average value of the first electric energy becomes 0.

6. The modular display apparatus of claim 1, wherein the first processor is further configured to reduce the driving time of the first light emitting diodes such that the average value of the first electric energy becomes the predetermined value, and/or increase a magnitude of the voltage applied to the cathodes of the first light emitting diodes such that the average value of the first electric energy becomes the predetermined value.

7. The modular display apparatus of claim 1, wherein the first sub-screen further comprises:
a memory configured to store at least one of information corresponding to the driving time of the first light emitting diodes and information on the voltage of the cathodes of the first light emitting diodes for controlling the average value of the first electric energy to be the predetermined value,
wherein the first processor is further configured to, based on information stored in the memory while operating in the dehumidification mode, control one or more of the driving time of the first light emitting diodes and the voltage of the cathodes of the first light emitting diodes.

8. The modular display apparatus of claim 1, wherein the plurality of sub-screens comprises a second sub-screen, the second sub-screen comprising:
a second sensor;
a second display module comprising a plurality of second pixels; and
a second processor configured to:
acquire a second electric energy of the plurality of second pixels based on voltages across second light emitting diodes of the plurality of second pixels; and
operate in the dehumidification mode based on humidity information acquired from the second sensor being greater than or equal to the predetermined threshold,
wherein operating in the dehumidification mode comprises controlling one or more of a driving time of the second light emitting diodes and a voltage of cathodes of the second light emitting diodes such that an average value of the second electric energy is held at the predetermined value.

9. The modular display apparatus of claim 8, wherein the first processor is further configured to acquire information on the average value of the first electric energy based on the voltage across the first light emitting diodes measured during a predetermined time period, and
wherein the second processor is further configured to acquire information on the average value of the second electric energy based on the voltage across the second light emitting diodes measured during the predetermined time period.

10. The modular display apparatus of claim 8, wherein the first processor is further configured to control one or more of the driving time of the first light emitting diodes and the voltage of the cathodes of the first light emitting diodes such that the average value of the first electric energy becomes 0, and
wherein the second processor is further configured to control one or more of the driving time of the second light emitting diodes and the voltage of the cathodes of the second light emitting diodes such that the average value of the second electric energy becomes 0.

11. The modular display apparatus of claim 1, wherein the first processor is further configured to:
calculate a first energy value based on a first voltage applied across both ends of the first light emitting diodes during a first time period of the driving time,
calculate a second energy value based on a second voltage applied across both ends of the first light emitting diodes during a second time period of the driving time, the second time period being different from the first time period, and
calculate the average value of the first electric energy based on a difference between the first energy value and the second energy value.

12. A method for controlling a modular display apparatus, the modular display apparatus including a sensor and a plurality of light emitting diodes, the method comprising:
operating in a dehumidification mode based on humidity information acquired from the sensor being greater than or equal to a predetermined threshold; and
controlling, while operating in the dehumidification mode, one or more of a driving time of the plurality of light emitting diodes and a voltage of cathodes of the plurality of light emitting diodes such that an average value of an electric energy acquired based on a voltage across the plurality of light emitting diodes is held at a predetermined value.

13. The method of claim 12, further comprising:
acquiring information on the average value of the electric energy based on the voltage across the plurality of light emitting diodes measured during a predetermined time period.

14. The method of claim 13, wherein the modular display apparatus further includes an integrated circuit (IC) electrically connected to the both ends of the plurality of light emitting diodes, and
wherein the controlling further comprises:
calculating, based on the voltage across the plurality of light emitting diodes measured during the predetermined time period by the IC, an average value of the electric energy; and
transmitting one or more of:
a first signal for controlling the driving time of the plurality of light emitting diodes to the IC such that the average value of the electric energy becomes the predetermined value; and
a second signal for controlling a voltage applied to the cathodes of the plurality of light emitting diodes to the IC such that the average value of the electric energy becomes the predetermined value.

15. The method of claim 14, further comprising applying a forward voltage to the plurality of light emitting diodes during a first time period of the predetermined time period and applying a reverse voltage to the plurality of light emitting diodes during a second time period of the predetermined time period,
- wherein the calculating the average value of the electric energy comprises:
  - acquiring, through the IC, information on a first voltage across the plurality of light emitting diodes measured during the first time period and a second voltage across the plurality of light emitting diodes measured during the second time period; and
  - calculating the average value of the electric energy based on the information on the first voltage and the second voltage.

16. The method of claim 12, wherein the controlling comprises controlling one or more of the driving time of the plurality of light emitting diodes and the voltage of the cathodes of the plurality of light emitting diodes such that the average value of the electric energy becomes 0.

17. The method of claim 12, wherein the controlling comprises reducing the driving time of the plurality of light emitting diodes such that the average value of the electric energy becomes the predetermined value, and/or increasing a magnitude of the voltage applied to the cathodes of the plurality of light emitting diodes such that the average value of the electric energy becomes the predetermined value.

18. The method of claim 12, further comprising:
- storing one or more of information on the driving time of the plurality of light emitting diodes and information on the voltage of the cathodes of the plurality of light emitting diodes for controlling the average value of the electric energy to the predetermined value,
- wherein the controlling comprises, based on information stored while operating in the dehumidification mode, controlling one or more of the driving time of the plurality of light emitting diodes and the voltage of the cathodes of the plurality of light emitting diodes.

19. The method of claim 12, further comprising:
- calculating a first energy value based on a first voltage applied across the plurality of light emitting diodes during a first time period of the driving time,
- calculating a second energy value based on a second voltage applied across the plurality of light emitting diodes during a second time period of the driving time, the second time period being different from the first time period, and
- calculating the average value of the electric energy based on a difference between the first energy value and the second energy value.

* * * * *